US007925307B2

(12) United States Patent
Horowitz et al.

(10) Patent No.: US 7,925,307 B2
(45) Date of Patent: Apr. 12, 2011

(54) AUDIO OUTPUT USING MULTIPLE SPEAKERS

(75) Inventors: Ronald J. Horowitz, Vallejo, CA (US); David F. Wilson, Los Altos, CA (US)

(73) Assignee: Palm, Inc., Sunnyvale, CA (US)

( * ) Notice: Subject to any disclaimer, the term of this patent is extended or adjusted under 35 U.S.C. 154(b) by 672 days.

(21) Appl. No.: 11/590,645

(22) Filed: Oct. 31, 2006

(65) Prior Publication Data

US 2008/0101589 A1 May 1, 2008

(51) Int. Cl.
*H04M 1/00* (2006.01)
(52) U.S. Cl. ........... 455/569.1; 455/556.2; 455/575.1
(58) Field of Classification Search . 379/388.01–388.03, 387.01, 420.01–420.04, 379/421, 431–433, 433.02, 433.01; 455/73, 455/569.1, 575.1, 569.2, 90.3, 556.2, 550.1; 381/386, 395, 55, 59, 72; 181/145, 199
See application file for complete search history.

(56) References Cited

U.S. PATENT DOCUMENTS

| | | | |
|---|---|---|---|
| 3,943,304 A | | 3/1976 | Piribauer |
| 4,583,245 A * | | 4/1986 | Gelow et al. .......... 381/59 |
| 4,887,298 A * | | 12/1989 | Haigler .......... 381/55 |
| 5,133,013 A | | 7/1992 | Munday |
| 5,224,151 A * | | 6/1993 | Bowen et al. .......... 455/569.1 |
| 5,491,747 A | | 2/1996 | Bartlett et al. |
| 5,524,058 A | | 6/1996 | Moseley |
| 5,555,449 A | | 9/1996 | Kim |
| 5,937,070 A | | 8/1999 | Todter et al. |
| 6,002,949 A * | | 12/1999 | Hawker et al. .......... 455/569.1 |
| 6,324,284 B1 * | | 11/2001 | Hawker et al. .......... 379/433.02 |
| 6,434,407 B1 * | | 8/2002 | Cook .......... 455/569.1 |
| 6,636,750 B1 | | 10/2003 | Zurek et al. |
| 6,758,303 B2 * | | 7/2004 | Zurek et al. .......... 181/155 |
| 6,978,010 B1 | | 12/2005 | Short et al. |
| 7,031,460 B1 | | 4/2006 | Zheng et al. |
| 7,058,430 B2 * | | 6/2006 | Aubauer et al. .......... 455/569.1 |
| 7,416,048 B2 * | | 8/2008 | Hongo et al. .......... 181/199 |
| 7,483,540 B2 * | | 1/2009 | Rabinowitz et al. .......... 381/103 |
| 2002/0106077 A1 | | 8/2002 | Moquin et al. |
| 2003/0185403 A1 | | 10/2003 | Sibbald |
| 2004/0062388 A1 | | 4/2004 | MacDonald et al. |
| 2004/0109578 A1 | | 6/2004 | Niederdrank et al. |
| 2004/0192243 A1 | | 9/2004 | Siegel |

(Continued)

FOREIGN PATENT DOCUMENTS

CA 2229424 2/1997

OTHER PUBLICATIONS

Audio crossover, printed from the website: http://en.wikipedia.org/wiki/Audio_crossover, dated Oct. 20, 2006.

*Primary Examiner* — George Eng
*Assistant Examiner* — Brandon J Miller
(74) *Attorney, Agent, or Firm* — Foley & Lardner LLP

(57) ABSTRACT

An electronic device comprises an earpiece speaker, a loudspeaker, and a processing circuit. The processing circuit is configured to receive a wireless telephony audio signal, to separate the audio signal into a first portion and a second portion, the first portion having higher frequency components than the second portion, wherein the processing circuit is configured to provide the first portion of the audio signal to the earpiece speaker and the second portion of the audio signal to the loudspeaker.

22 Claims, 5 Drawing Sheets

U.S. PATENT DOCUMENTS

| | | |
|---|---|---|
| 2005/0026568 A1* | 2/2005 | Hawker et al. ................ 455/70 |
| 2005/0053247 A1* | 3/2005 | Petronio et al. ............... 381/99 |
| 2005/0091290 A1* | 4/2005 | Cameron et al. ............. 707/201 |
| 2005/0181841 A1* | 8/2005 | Dou ........................... 455/575.1 |
| 2006/0183508 A1* | 8/2006 | Douhet et al. ............. 455/569.1 |
| 2007/0177742 A1* | 8/2007 | Edgren et al. .................... 381/89 |
| 2007/0263883 A1* | 11/2007 | Jakowski ...................... 381/110 |
| 2008/0146291 A1* | 6/2008 | Huisken ..................... 455/569.1 |

* cited by examiner

AUDIO OUTPUT USING MULTIPLE SPEAKERS

BACKGROUND

Mobile telephones come in a variety of shapes and sizes, and are used in many different environments. Some mobile telephones provide multiple speakers, for example, to provide a conventional earpiece telephone functionality as well as a speakerphone functionality.

One suitable industrial design for an earpiece speaker is a cup shape. However, the appropriate industrial design does not fit the sleek look and form factor demanded by consumers of mobile telephones. Some mobile telephones, such as smartphones, have a large touchscreen. The telephony receiver and earpiece are placed above the touchscreen, are becoming smaller, and cannot overhang above the touchscreen. The earpiece speaker in this configuration is leaky compared to the appropriate industrial design.

Some mobile telephones also use high output impedance receivers to drive the earpiece speaker. These receivers do not adequately drive a low impedance load. Consequently, these mobile telephones have inherently restricted low frequency output and high distortion.

There is a need for an electronic device having improved low frequency performance. Further, there is a need for a mobile device having improved audio output wherein the earpiece has a configuration suitable for a mobile telephone.

The teachings herein extend to those embodiments which are within the scope of the appended claims, regardless of whether they accomplish one or more of the above-mentioned needs.

DETAILED DESCRIPTION OF EXEMPLARY EMBODIMENTS

Figure 1:
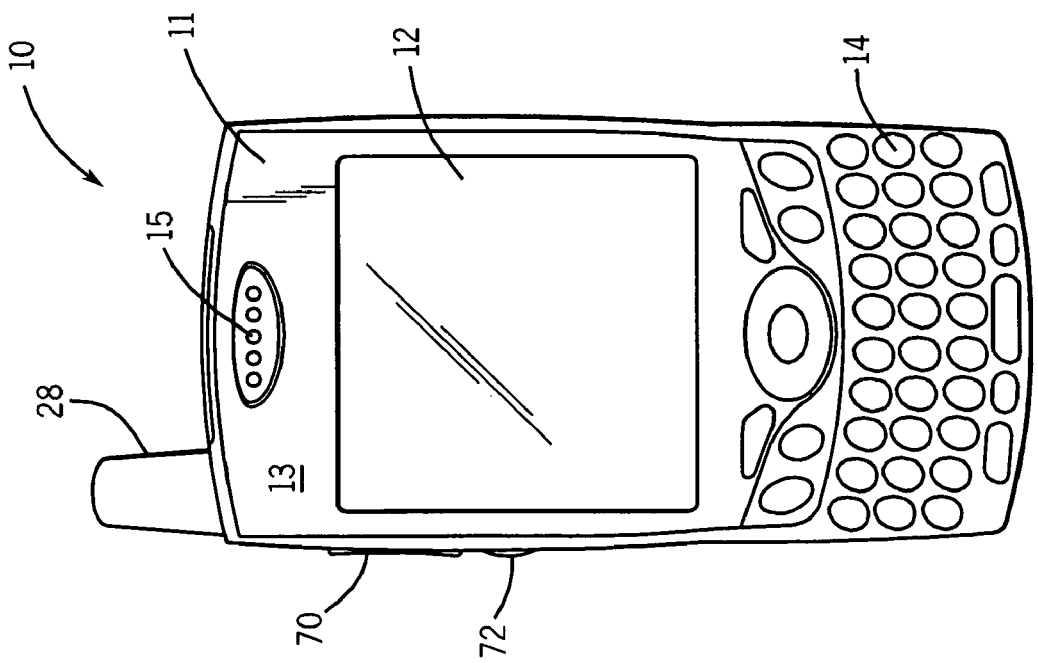
FIG. 1 is a front view of a mobile computing device, according to an exemplary embodiment.

Referring first to FIG. 1, a mobile computing device 10 is shown. Device 10 is a smart phone, which is a combination mobile telephone and handheld computer having personal digital assistant functionality. The teachings herein can be applied to other mobile computing devices (e.g., a laptop computer) or other electronic devices (e.g., a desktop personal computer, home or car audio system, etc.). Personal digital assistant functionality can comprise one or more of personal information management, database functions, word processing, spreadsheets, voice memo recording, etc. and is configured to synchronize personal information from one or more applications with a computer (e.g., desktop, laptop, server, etc.). Device 10 is further configured to receive and operate additional applications provided to device 10 after manufacture, e.g., via wired or wireless download, SecureDigital card, etc.

Figure 2:
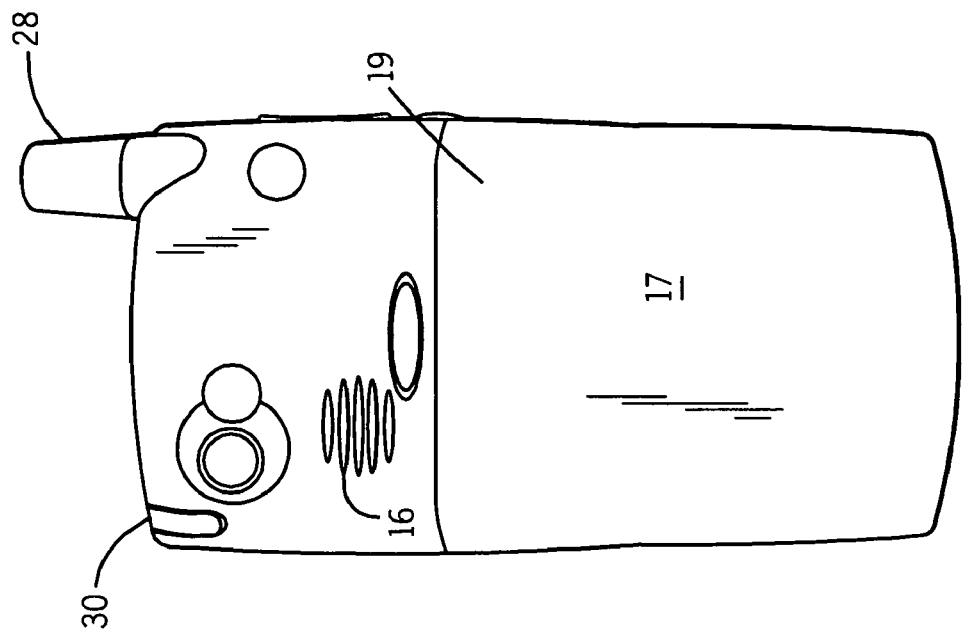
FIG. 2 is a back view of a mobile computing device, according to an exemplary embodiment.

Device 10 comprises a display 12 and a user input device 14 (e.g., a QWERTY keyboard, buttons, touch screen, speech recognition engine, etc.). Device 10 also comprises an earpiece speaker 15. Earpiece speaker 15 may be a speaker configured to provide audio output with a volume suitable for a user placing earpiece 15 against or near the ear. Earpiece 15 may be part of an electrodynamic receiver such as part number 419523 manufactured by Foster Electric Co., Ltd., Japan. Earpiece 15 may be positioned above display 12 or in another location on device 10. Device 10 comprises a housing 11 having a front side 13 and a back side 17 (FIG. 2). Earpiece 15 may be positioned on the front side 13 along with display 12 and user input device 14, and a loudspeaker 16 may be positioned on the back side along with a battery compartment 19. In alternative embodiments, display 12, user input device 14, earpiece 15 and loudspeaker 16 may each be positioned anywhere on front side 13, back side 17 or the edges therebetween.

Loudspeaker 16 is an electro-acoustic transducer that converts electrical signals into sounds loud enough to be heard at a distance. Loudspeaker 16 can be used for a speakerphone functionality. While loudspeaker 16 may be configured to produce audio output at a plurality of different volumes, it is typically configured to produce audio output at a volume suitable for a user to comfortably hear at some distance from the speaker, such as a few inches to a few feet away. Loudspeaker 16 may be an electrodynamic loudspeaker, such as part number HDR 9164, manufactured by Hosiden Corporation, Osaka, Japan.

Figure 3:
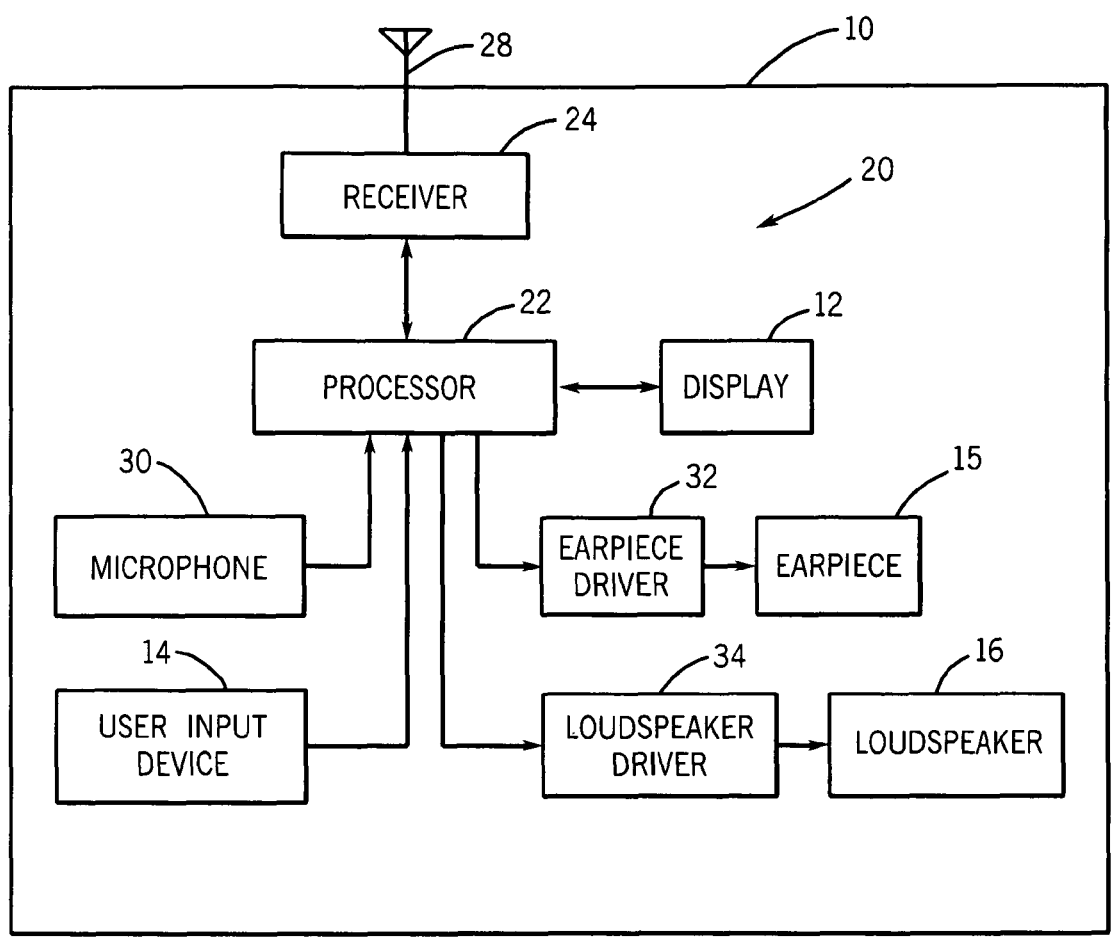
FIG. 3 is a block diagram of the mobile computing device of FIGS. 1 and 2, according to an exemplary embodiment.

Referring now to FIG. 3, device 10 comprises a processing circuit 20 comprising a processor 22. Processor 22 can comprise one or more microprocessors, microcontrollers, and other analog and/or digital circuit components configured to perform the functions described herein. Processor 22 comprises one or more memory chips (e.g., random access memory, read only memory, flash, etc.) configured to store software applications provided during manufacture or subsequent to manufacture by the user or by a distributor of device 10. In one embodiment, processor 22 can comprise a first, applications microprocessor configured to run a variety of personal information management applications, such as calendar, contacts, etc., and a second, radio processor on a separate chip or as part of a dual-core chip with the application processor. The radio processor is configured to operate telephony functionality. Device 10 can be configured for cellular radio telephone communication, such as Code Division Multiple Access (CDMA), Global System for Mobile Communications (GSM), Third Generation (3G) systems such as WideBand CDMA (WCDMA), or other cellular radio telephone technologies. Device 10 can further be configured for data communication functionality, for example, via GSM with General Packet Radio Service (GPRS) systems (GSM/GPRS), CDMA/1XRTT systems, Enhanced Data Rates for Global Evolution (EDGE) systems, Evolution Data Only or Evolution Data Optimized (EV-DO), and/or other data communication technologies.

Device 10 comprises a receiver 24 which comprises analog and/or digital electrical components configured to receive and transmit wireless signals via antenna 28 to provide cellular telephone and/or data communications with a fixed wireless access point, such as a cellular telephone tower, in conjunction with a network carrier, such as, Verizon Wireless, Sprint, etc. Device 10 can further comprise circuitry to provide communication over a local area network, such as Ethernet or according to an IEEE 802.11x standard or a personal area network, such as a Bluetooth or infrared communication technology.

Device 10 further comprises a microphone 30 configured to receive audio signals, such as voice signals, from a user or other person in the vicinity of device 10, typically by way of spoken words. Microphone 30 is configured as an electro-acoustic sense element to provide audio signals from the vicinity of device 10 and to convert them to an electrical signal to provide to processor 22. Processor 22 can provide a digital memo recorder function, wireless telephone function, etc. with words spoken into microphone 30. Processor 22 may also provide speech recognition and/or voice control of features operable on device 10. Display 12 can comprise a touch screen display in order to provide user input to processor 22 to control functions, such as to dial a telephone number, enable/disable speakerphone audio, provide user inputs regarding increasing or decreasing the volume of audio provided through earpiece 15 and/or loudspeaker 16, etc. Alternatively or in addition, user input device 14 can provide similar inputs as those of touch screen display 12. Device 10 can further comprise a stylus 30 to assist the user in making selections on display 12. Processor 22 can further be configured to provide video conferencing capabilities by displaying on display 12 video from a remote participant to a video conference, by providing a video camera on device 12 for providing images to the remote participant, by providing text messaging, two-way audio streaming in full- and/or half-duplex mode, etc.

Referring again to FIG. 3, an earpiece driver circuit 32 and a loudspeaker driver circuit 34 are provided, which may comprise analog and/or digital circuitry configured to receive audio data from processor 22 and to provide filtering, signal processing, equalizer functions, or other audio signal processing steps to audio data. For example, the incoming audio data can comprise one or more of a downlink signal received by receiver 24 from a remote participant to a telephone call or a video conference, prerecorded audio, or audio from a game or audio file stored on device 10, etc. Drivers 32, 34 may then provide the audio data to earpiece 15 and/or loudspeaker 16 to provide the audio to a user or another person in the vicinity of device 10. Drivers 32, 34 may be part no. TPA6203A1, manufactured by Texas Instruments Inc., Dallas, Tex.

Figure 4:
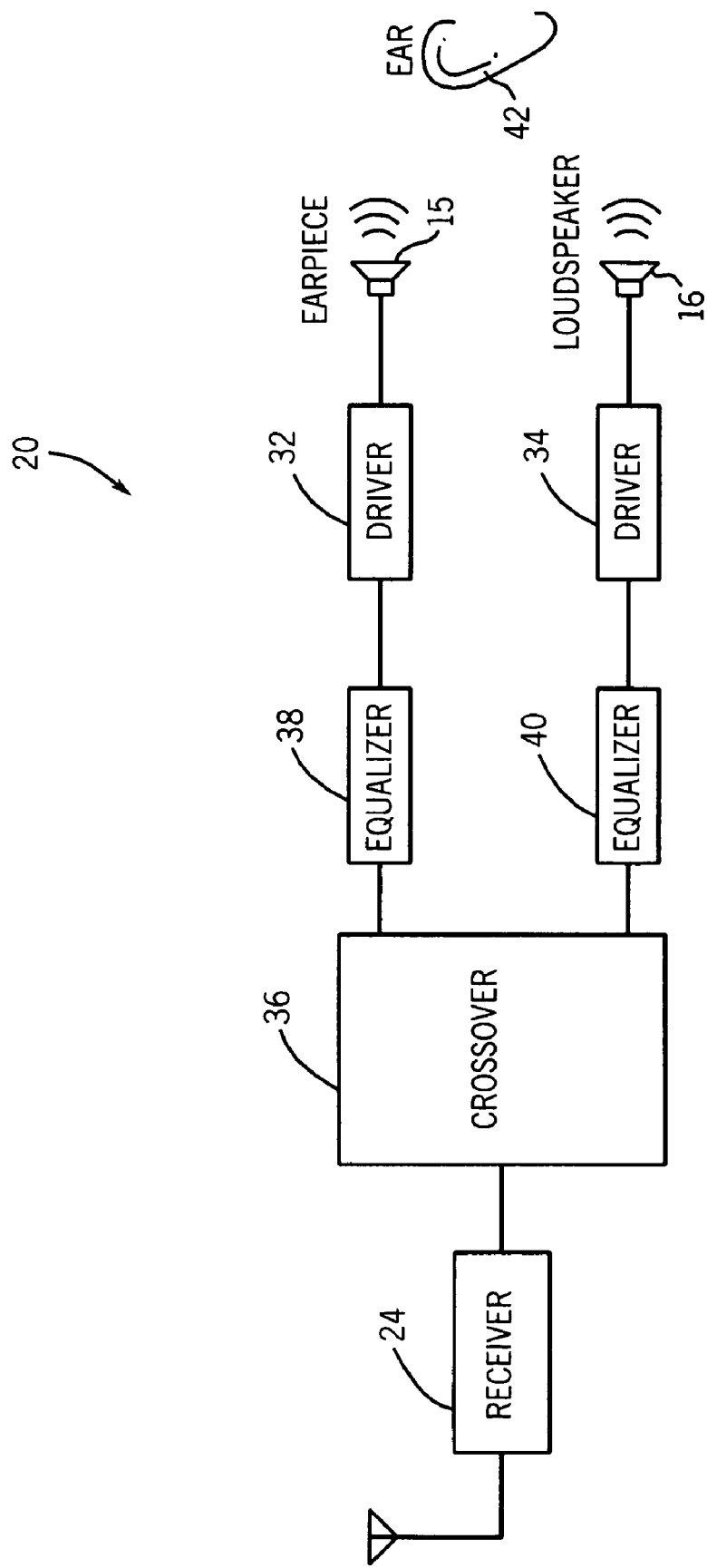
FIG. 4 is a block diagram of a processing circuit for processing and audio signal, according to an exemplary embodiment.

Referring now to FIG. 4, a portion of processing circuit 20 is shown comprising receiver 24, a crossover 36, equalizers 38, 40 and drivers 32, 34. Processing circuit 20 is configured to receive an audio signal having a range of frequency components, to provide at least a higher frequency portion of the audio signal to earpiece 15 and to provide at least a lower frequency portion of the audio signal having frequency components lower than the higher portion to loudspeaker 16. In this exemplary embodiment, a crossover 36 is provided to separate or divide an audio signal received from receiver 24 (e.g., a downlink signal from a telephony communication) into suitable low and high frequency ranges. Crossover 36 is configured to provide a portion of the audio signal having higher frequency components to equalizer 38, which applies an equalizer function to the audio signal before providing the signal to driver 32 to drive audio output via earpiece 15. A portion of the audio signal having lower frequency components is provided to equalizer 40 to provide an equalizer function and to driver 34 to drive loudspeaker 16 to provide lower frequency components of the audio signal. A user 42 then hears audio signals from both earpiece 15 and loudspeaker 16 in combination. A signal arriving at user 42's ear will be the acoustical sum of the two signals. The block diagram of FIG. 4 is merely exemplary, and other functional blocks, such as, filtering, amplifying, attenuating, echo cancellation, noise cancellation, and other functions, may be applied to the audio signal from receiver 24 or the portions of the audio signal provided by crossover 36.

Crossover 36 is configured to split or divide the audio signal into separate frequency bands that can be handled by drivers 32, 34, wherein driver 32 is optimized for higher frequency driving in this exemplary embodiment and driver 34 is optimized for lower frequency driving in this exemplary embodiment. Crossover 36 may be an active, or passive, mechanical or digital crossover and may be a filter of a type having a first, second, third, or higher order, or a mixed order crossover. Further, crossover 36 may provide a series or parallel typology. In one exemplary embodiment, crossover 36 may be an active digital crossover. Crossover 36 may alternatively be a divider, splitter, filter or other circuit element or component (or components) configured to provide one or more higher frequency portions of the audio signal to earpiece 15 and to provide one or more lower frequency portions of the audio signal to loudspeaker 16. In one exemplary embodiment, the entire audio signal is provided to earpiece 15 and selected frequency components lower than the highest frequency component of the audio signal are provided to loudspeaker 16. In another exemplary embodiment, a range of frequency components higher than a lower range of frequency components is provided to earpiece 15, while the lower frequency components are provided to loudspeaker 16 only. In another exemplary embodiment, the entire audio signal is provided to loudspeaker 16, and predetermined frequency components higher than the lowest frequency component of the audio signal are provided to earpiece 15.

According to one embodiment, receiver 24 has a high acoustical output impedance which is not optimal for driving a low impedance load. Accordingly, to reduce distortion and improve low frequency output, processing circuit 20 is configured to provide a lower frequency portion of the audio signal to loudspeaker 16.

Processing circuit 20 is configured to provide the higher frequency portion (which can comprise all of the audio signal) to earpiece 15 at a first range of volumes suitable for earpiece use. Processing circuit 20 is further configured to simultaneously provide audible signals at a second range of volumes suitable for speakerphone use to loudspeaker 16.

According to one embodiment, crossover 36 is configured to provide a threshold and provides the higher frequency portion by providing frequencies above the threshold and provides a lower frequency portion by providing frequencies below the threshold. It is understood that in this embodiment, a low amplitude of some frequency components from one side of the threshold may still be provided on the other side of the threshold, though at a sufficiently alternated level so as to effectively be separated or divided, as is known in the art of audio crossovers.

According to another embodiment, equalizers 38 and 40 can have different characteristics or the same characteristics, depending at least in part on the acoustical characteristics of the transducers (i.e., earpiece 15 and loudspeaker 16), order, filter type (i.e., Butterworth, elliptic, chebysher and Q).

According to one exemplary embodiment, device 10 can be a handheld device, which is a device configured to have a form factor which can easily be held in a person's hand and also can easily fit in a person's pocket.

Figure 5:
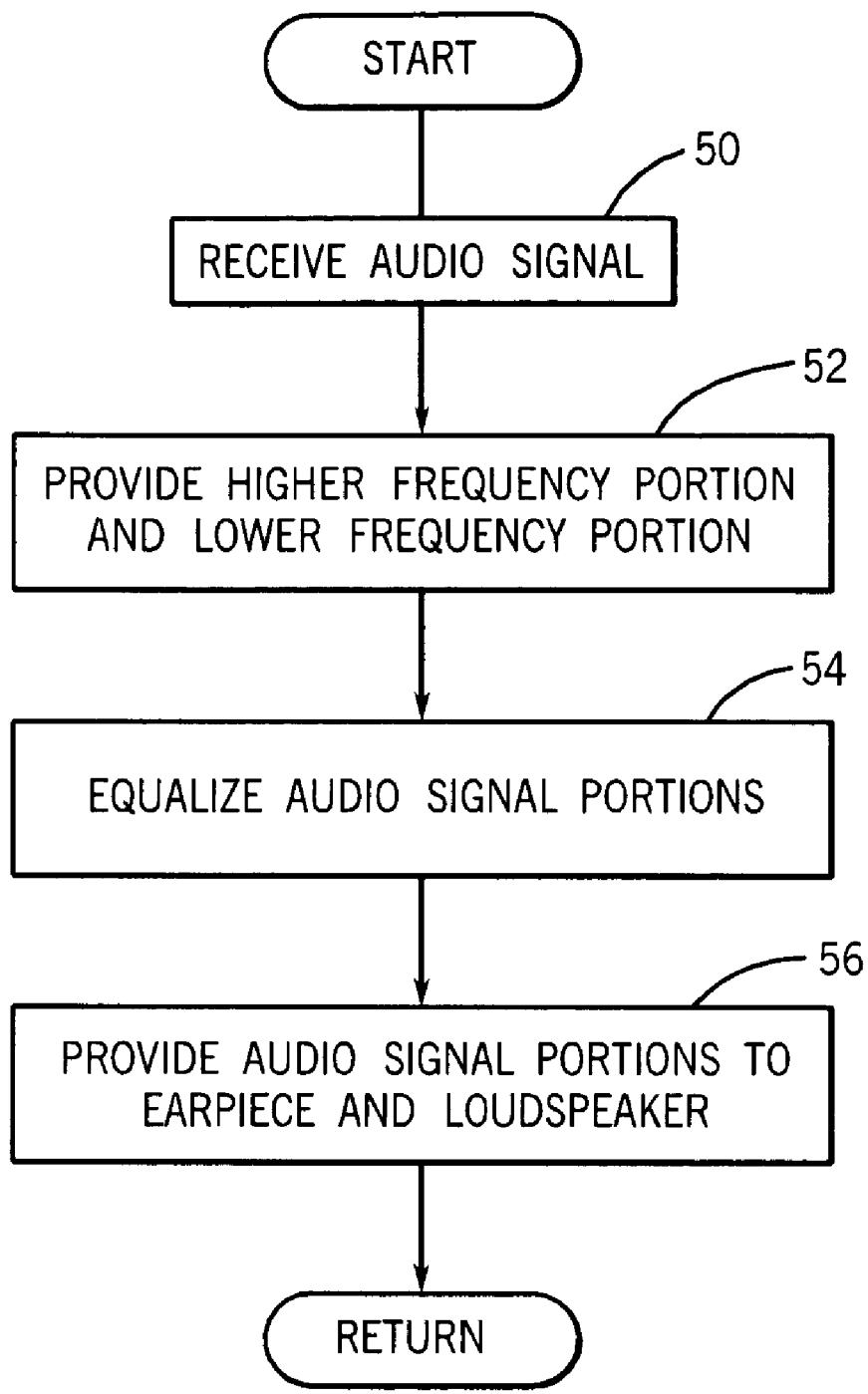
FIG. 5 is a flowchart of a method of processing an audio signal, according to an exemplary embodiment.

Referring now to FIG. 5, an exemplary method is shown. At step 50, receiver 24 receives an audio signal, which can be a wireless telephony audio signal, such as a signal received during a telephone call or from a voice mail system. At step 52, a higher frequency portion (which may be all) of the audio signal is provided to earpiece 15 and a lower frequency portion (which can be all) of the audio signal is provided to loudspeaker 16. At step 54, equalizers 38 and 40 are provided to equalize the portions of the audio signal. At step 56, the audio signal portions are provided via drivers 32, 34 to earpiece 15 and loudspeaker 16, respectively.

Figure 6:
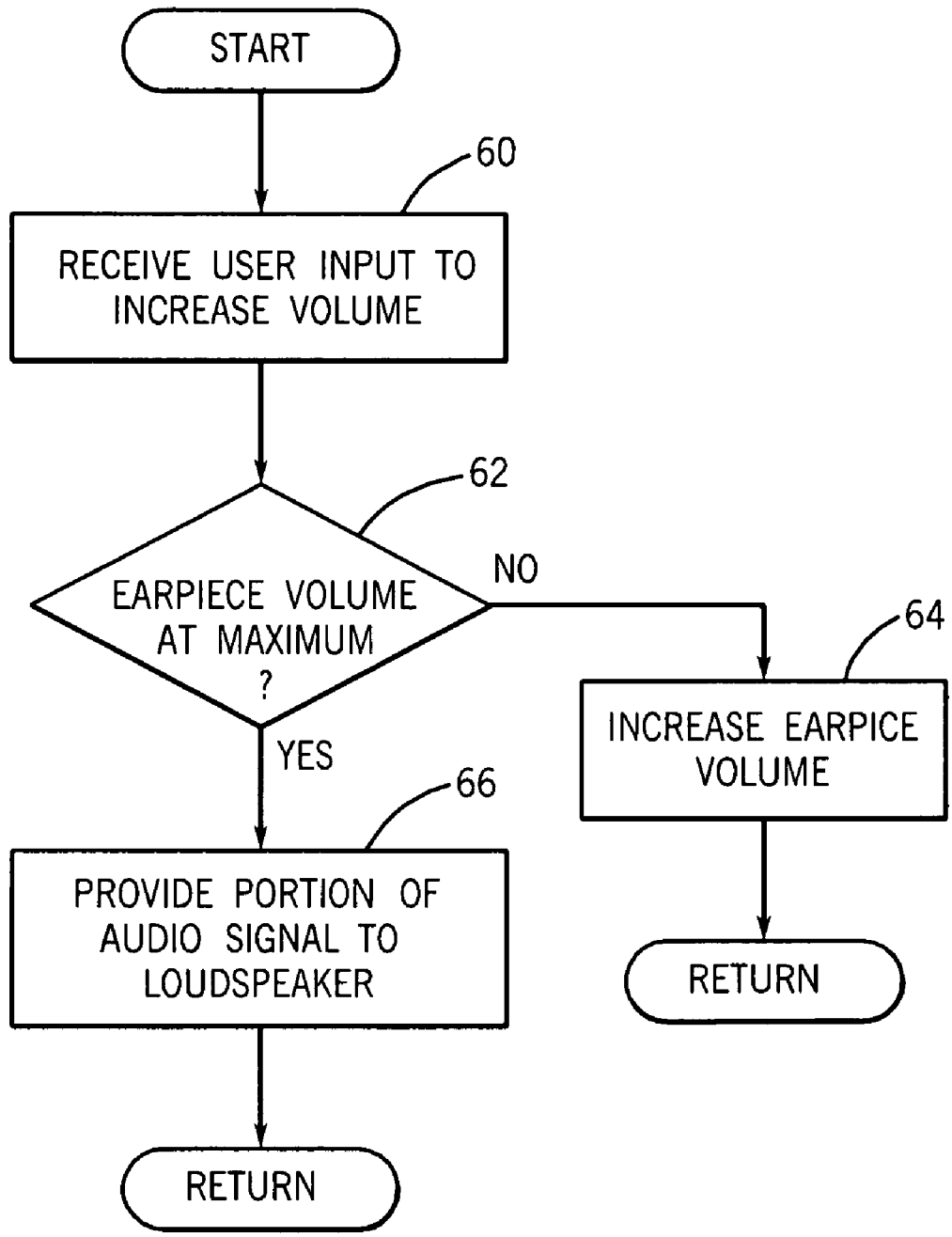
FIG. 6 is a flowchart of a method of processing an audio signal, according to an exemplary embodiment.

Referring now to FIG. 6, an exemplary system and method for providing an audio signal will be described. At a step 60, processing circuit 20 is configured to receive user input indicating a desire to increase volume. The user input can be provided via a touch screen interface on display 12, or via user input device 14, which can comprise inputs from the keyboard or from dedicated volume control buttons 70, 72 (FIG. 1). Processing circuit 20 can be configured to provide feedback to the user via display 12 indicating a level among a plurality of levels at which the volume is set. Further, display 12 can provide a plurality of display items, one for each of the speakers on device 10 (which can comprise two or more speakers for various functions), and associated volume settings from among a plurality of individual settings for each of the speakers.

At step 62, processing circuit 20 is configured to determine whether the earpiece volume is at its maximum setting from among the plurality of settings. If not, at step 64, the earpiece volume is increased and the processor returns. If the earpiece volume is at its maximum, at a step 66, a portion of the audio signal is provided to loudspeaker 16. In this exemplary embodiment, an audio signal is provided only to earpiece 15 at low, middle, and some higher volumes, but when processing circuit 20 has the volume of earpiece 16 set at its maximum volume and a user input is received indicating a desire to further increase volume, then processing circuit 20 enters a mode wherein the audio signal is provided to both earpiece 15 and loudspeaker 16. Further inputs from the user indicating further desire to increase the volume may result in further increases in the volume of the portion (or all) of the audio signal provided to loudspeaker 16 up to a predetermined maximum volume setting for loudspeaker 16. In this embodiment, crossover 36 or other frequency divider can be used to separate the audio signal into higher and lower frequency components to be provided at earpiece 15 and loudspeaker 16, in accordance with the method of FIG. 6. Alternatively, the method of FIG. 6 can be implemented without the frequency dividing function of FIG. 4.

Accordingly, in the embodiment of FIG. 6, processing circuit 20 is configured to switch from providing at least a portion of the audio signal to the earpiece speaker only to providing the lower frequency portion of the audio signal to the loudspeaker, based on a signal from the user input device. Further, processing circuit 20 is configured to increase the volume of the audio signal provided to the earpiece speaker in a plurality of steps (for example, at least two or at least three or more steps) based on the signal from user input device 14.

According to another embodiment, relating to FIG. 6, processing circuit 20 is configured to operate in a first mode in which at least a portion of the audio signal is provided to the earpiece speaker only and in a second mode the first portion is provided to the earpiece speaker and a second portion of the audio signal is provided to the loudspeaker, wherein processing circuit 20 enters the second mode based on the user input indicative of a desired increase in the volume of the audio signal playing in earpiece speaker 15.

According to another embodiment, processing circuit 20 is configured in an electronic device to provide an audio signal to a first speaker (which may or may not be an earpiece), to increase the volume over a plurality of steps in response to inputs from user input device 14, and in response to a further input from user input device 14 indicating a request to increase the volume, to provide at least portions of the audio signal to the first and second speakers (which, again, may or may not be an earpiece or loudspeaker) simultaneously. This embodiment may have applications in electronic devices outside of the mobile device field. According to another exemplary embodiment, the portion of the audio signal provided over the second speaker is a lower frequency portion of a range of frequency components lower than a range of frequency components of the audio signal.

While the exemplary embodiments illustrated in the Figs. and described above are presently exemplary, it should be understood that these embodiments are offered by way of example only. For example, the teachings herein can apply to a home or car audio system having a plurality of speakers, each having different impedance characteristics. Also, any frequency components from an audio signal may be provided to a plurality of speakers (e.g., two, three or more different speakers), depending on the constraints of the system. Accordingly, the present invention is not limited to a particular embodiment, but extends to various modifications that nevertheless fall within the scope of the appended claims.

What is claimed is:

1. An electronic device, comprising:
   an earpiece speaker;
   a user input device;
   a loudspeaker; and
   a processing circuit configured to receive an audio signal having a range of frequency components, to provide at least a higher frequency portion of the audio signal to the earpiece speaker at a first range of volumes suitable for earpiece use and to simultaneously provide a lower frequency portion of the audio signal having frequency components lower than the higher frequency portion to the loudspeaker,
   wherein the processing circuit is configured to switch from providing the audio signal to the earpiece speaker only to providing the higher frequency portion of the audio signal to the earpiece speaker and simultaneously providing the lower frequency portion of the audio signal to the loudspeaker based on a signal from the user input device indicative of a desire to increase a volume of the audio signal playing in the earpiece speaker above a maximum volume associated with the earpiece speaker.

2. The electronic device of claim 1, wherein the processing circuit is configured to provide the higher frequency portion to the earpiece speaker at a first range of volumes suitable for earpiece use and to provide the lower frequency portion at a second range of volumes suitable for speakerphone use to the loudspeaker.

3. The electronic device of claim 1, wherein the processing circuit is configured to provide the higher frequency portion by providing frequencies above a threshold and to provide the lower frequency portion by providing frequencies below the threshold.

4. The electronic device of claim 1, wherein the processing circuit is configured to apply a first equalizer process to the first portion of the signal and a second equalizer process to the second portion of the signal.

5. The electronic device of claim 1, wherein the processing circuit is configured to increase the volume of the audio signal provided to the earpiece speaker in at least three steps based on the signal from the user input device.

6. The electronic device of claim 1, wherein the processing circuit is configured to receive an audio signal from a wireless telephony signal.

7. The electronic device of claim 1, wherein the electronic device is a handheld device.

8. The electronic device of claim 7, wherein the electronic device comprises a plurality of personal information management applications and the processing circuit is configured to synchronize personal information from the applications with another computer.

9. The electronic device of claim 7, further comprising a housing having a front side comprising a display screen and a back side, wherein the earpiece speaker is disposed on the front side and the loudspeaker is disposed on the back side.

10. The electronic device of claim 1, wherein the processing circuit comprises a crossover configured to split the audio signal into the lower frequency portion and the higher frequency portion.

11. A mobile computing device, comprising:
a first speaker;
a user input device;
a second speaker; and
a processing circuit configured to receive a wireless telephony audio signal, to separate the audio signal into a first portion and a second portion, the first portion having higher frequency components than the second portion, wherein the processing circuit is configured to provide the first portion of the audio signal to the first speaker at a first range of volumes suitable for earpiece use and to simultaneously provide the second portion of the audio signal to the second speaker;
wherein in a first mode the audio signal is provided to the first speaker only and in a second mode the first portion is provided to the first speaker and the second portion is provided to the second speaker, wherein the processing circuit enters the second mode based on a signal from the user input device indicative of a desire to increase a volume of the audio signal playing in the first speaker in the first mode to a level above a maximum volume associated with the first mode.

12. The mobile computing device of claim 11, wherein the first speaker is an earpiece speaker and the second speaker is a loudspeaker.

13. The mobile computing device of claim 11, wherein the electronic device comprises a plurality of personal information management applications and the processing circuit is configured to synchronize personal information from the applications with a computer.

14. The electronic device of claim 11, wherein the processing circuit is configured to increase the volume of the second portion of the audio signal provided to the second speaker based on a signal from the input device indicative of a desire for a further increase in volume while in the second mode.

15. An electronic device, comprising:
a first speaker;
a second speaker;
a user input device; and
a processing circuit configured to provide an audio signal to the first speaker, to increase the volume over a plurality of steps in response to inputs from the user input device, and, in response to a further input from the user input device indicating a request to increase the volume above a maximum volume associated with the first speaker, to provide at least portions of the audio signal to the first and second speakers simultaneously.

16. The electronic device of claim 15, wherein the portion of the audio signal provided over the second speaker is a lower frequency portion having a range of frequency components lower than a range of frequency components of the audio signal.

17. The electronic device of claim 16, wherein the second speaker is a loudspeaker.

18. The electronic device of claim 15, wherein the electronic device is a handheld device.

19. The electronic device of claim 18, wherein the electronic device comprises a plurality of personal information management applications and the processing circuit is configured to synchronize personal information from the applications with another computer.

20. The electronic device of claim 15, wherein the first speaker is an earpiece speaker on a first side of a mobile computing device and the second speaker is a loudspeaker on a second side of the mobile computing device.

21. The electronic device of claim 15, wherein the further input is received after the volume of the first speaker is set at the maximum volume.

22. The electronic device of claim 21, wherein additional further inputs from the user result in further increases in the volume of the audio signal provided to the second speaker.

* * * * *